UNITED STATES PATENT OFFICE

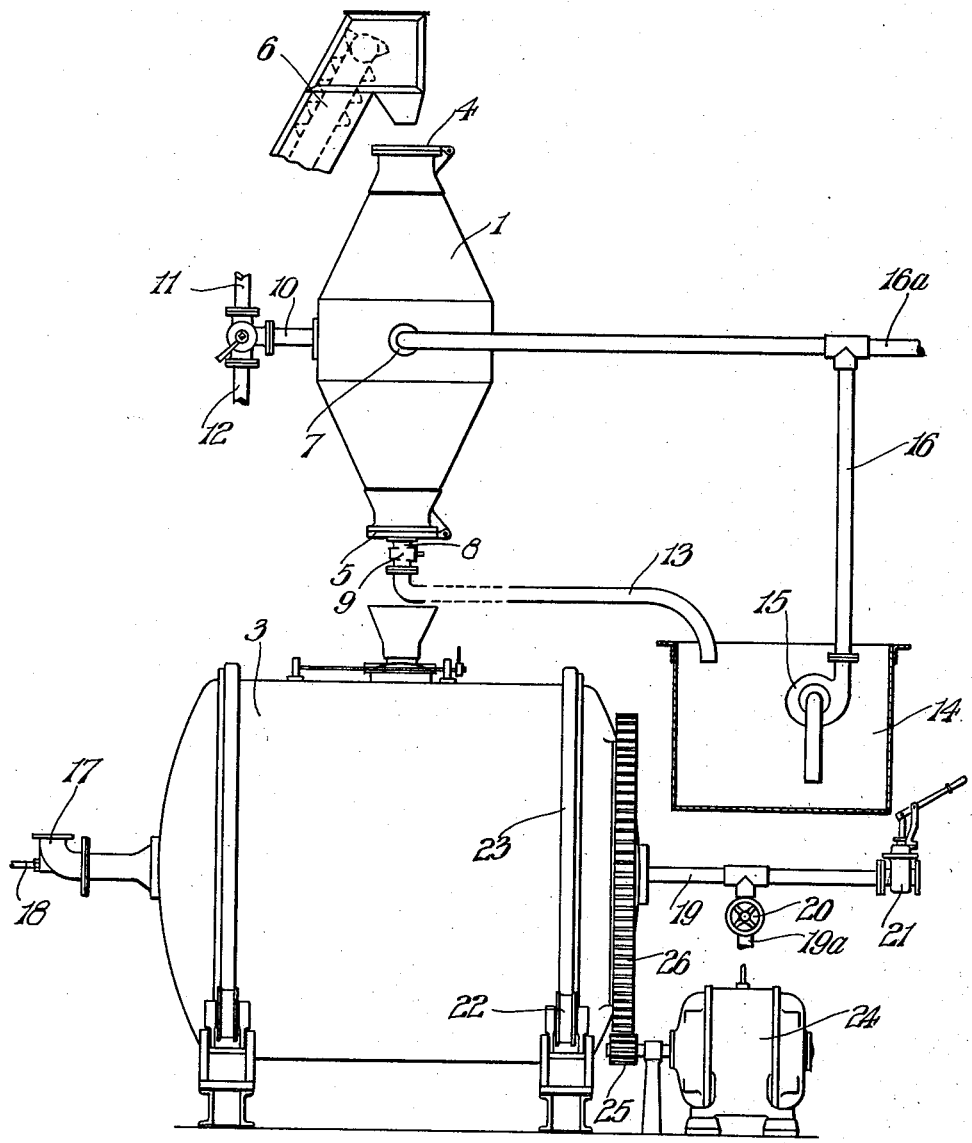

2,358,251

PROCESS FOR THE TREATMENT OF RICE AND OTHER CEREALS

Erich Gustav Huzenlaub, Brentford, and John Heron Rogers, Elmhurst, Kenley, England; Francis Heron Rogers executor of said John Heron Rogers, deceased Application November 30, 1940, Serial No. 368,092 In Great Britain November 30, 1939

9 Claims. (Cl. 99—80)

This invention relates to an improved process and apparatus for the treatment of rice paddy or loonzain which latter material is rice which has been dehusked or partly dehusked. The process also applies to other cereals.

In a prior application Serial No. 188,013, a process for the treatment of rice was described wherein either paddy or dehusked rice was soaked by steeping it in water which was accelerated by subjecting the steeping water to a pressure above the pressure of the atmosphere and above the vapour pressure of the steeping water and in some cases afterwards treating the grain so steeped with steam and subsequently drying the grain below atmospheric pressure.

The above process accelerates the normal and native methods of parboiling rice and places the entire process of water permeation and drying under complete control and the effect of the operation is the production of rice wherein the starch particles have become gelatinised, rendered uniformly translucent and relatively sterile.

The object of the present invention is to lessen somewhat the prime cost of plant installation and achieve a further economy in time, fuel consumption and labour necessary for treatment. The product is also improved.

The method of this invention produces the highest degree of gelatinization possible in a rice grain, leaving it totally free from any white, chalky, light refracting spots or sections on the grain surface or grain interior, it produces a rice grain without any tint or colouration beyond the slightly creamy tint which is usually regarded as a characteristic of the very highest grades of rice, and it produces further a rice grain which is free from any objectionable odor during subsequent cooking.

These objects are achieved by the combination of processing procedures, particularly by the utilization of the moisture in the grain after it has been steeped in water under pressure, following evacuation of the air in the grains, for the purpose of producing the required steam pressure in the grains in the second vessel, which is followed, immediately the required pressure is achieved, by suddenly blowing off the steam, so as to promptly reduce the grain temperature to boiling, and immediately following this stage, without admitting air to the grains, by a vacuum water evaporating step, which removes the remaining excess moisture in the grains.

The invention consists, and as applied to rice, in steeping the rice either as paddy or loonzain in pressure vessels in hot water to permit water permeation, draining off the steeping water for recycling with a further batch, and decanting the rice from the steeping vessel into a drying vessel and then raising the temperature of the hot wet rice in said drying vessel until a temperature of say 110° C. is achieved, blowing off the vapour or steam so formed suddenly or otherwise and damping the grain by steam if required, then, whilst maintaining the steam in the jackets and/or tubes of the drying vessel, placing the said vessel during rotation at a pressure below that of atmosphere. With modifications as hereafter appearing the said process is applicable to wheat and other cereals.

Reference will now be made to the accompanying drawing which illustrates diagrammatically an apparatus for carrying out the invention.

The apparatus employed consists essentially of a steeping vessel 1 supported above a heat treating and drying vessel 3. The steeping vessel 1 is of double-conical form provided with hinged caps 4, 5 at its upper and lower ends respectively, the grain being filled into the vessel by an elevator 6. An inlet 7 for steam and for hot water is provided at the mid-point of the steeping vessel, and an outlet 8 under control of a cock 9 is provided on the lower cap 5 for the purpose of draining off the steeping water. A further port 10 is provided by which the interior of the steeping vessel may be connected to a source of compressed air through a conduit 11 or to a source of suction through a conduit 12.

In order to enable the drained steeping water to be recycled with a further batch, the outlet 8 has a flexible connection with a conduit 13 which discharges into a tank 14, the contents of the tank being raised when required by a pump 15 which returns the water through a conduit 16 and inlet 7 to the steeping vessel. Additional hot water or steam may also be admitted through a branch pipe 16a to maintain the steeping water at the desired temperature.

The drying vessel 3 is of the steam-jacketted type and is preferably also provided with steam heat tubes traversing the drying chamber, inlets 17, 18 being provided at one end of the chamber for the admission of steam to the steam jacket and tubes and to the treating chamber respectively. At the other end of the treating chamber is provided an outlet conduit 19 which is branched, one branch 19a leading to a vacuum pump and being provided with a control valve 20 whilst the other branch 19b discharges to atmosphere through lever-operated gate valve 21 or similar quickly operable valve so that a sudden blow-off of vapour or sudden release of pressure within the steeping vessel may be effected.

The drying vessel 3 is supported for rotary movement by flanged rollers 22 engaging circumferential rails 23 fitted externally of the dryer jacket, and is driven by a motor 24 through pinion and spur wheel gearing 25, 26.

In operation, rice is elevated and fed into the steeping vessel after which the cover 4 is closed and the valve in the conduit 12 is actuated to connect the interior of the vessel to the source of suction which may conveniently be a vacuum pump. The partial vacuum is maintained for a sufficient period to allow air to escape from the interior of the grain and then hot water to cover the grain at a temperature of between 55° and 80° C. is admitted and the vessel put under a substantial pressure by admitting compressed air, the pressure varying according to the nature of the grain between 25 and 100 lbs. or more per square inch. The preliminary vacuum treatment and the pressure steeping facilitates soaking of the grain and a partial gelatinisation rapidly takes place. The compressed air supply is now shut off, the cock 9 is opened so that the steeping water is drained off into tank 14 for use with a further batch, and cap 5 is then opened and the contents of the steeping vessel discharged into the drying vessel 3. The grain enters the dryer with little loss of heat, for example, it may be at a temperature of 65° C. and steam is then admitted to the jacket and tubes of the drying vessel through inlet 17 for the purpose of heat-treating the wet rice until an internal vapour pressure of approximately 110° C. is reached, or at any rate until a pressure is attained which indicates that the boiling point of water has been achieved.

The accumulated vapour or steam may now be withdrawn by opening the valve 20 and so subjecting the interior of the drying vessel to suction but preferably the gate valve 21 is opened so that the vapour or steam is blown off suddenly whereby it carries away any traces of smell which otherwise affect the grain. At this stage the grain has become completely gelatinised and partly deprived of its moisture.

The blow-off valve 21 is now closed and a vacuum placed upon the interior of the drying vessel by opening valve 20 so that vaporisation of the remaining moisture in the grain takes place, the evaporation continuing until a normal dry weight is achieved i. e. moisture of say 15% only is residual within the rice.

In order to expedite the gelatinisation a small amount of additional steam may be introduced to the rice through inlet 18 immediately after the rice has entered the interior of the drying chamber, this introduction of steam causing a rise of temperature and equally by condensation on the grain adds a small amount of water which not only assists penetration of the starch but ensures complete gelatinisation. The latter steam treatment is particularly necessary in some types of rice that have individual grains of large diameter compared with their length such as Moulmein. With grain, however, that is long and of small diameter, such as some types of British Guiana rice, the above additional steam treatment is not essential.

When treating wheat and barley the time of steeping as well as the temperature of the steeping water are less than that necessary for rice, further it is not necessary in the case of these cereals to build up a pressure above atmospheric, so long as the grain is submitted to a temperature just above boiling water.

When the drying is complete the grain may be taken whilst still in its warm condition and cooled and stored for milling, after which it will be found to be sterile, thoroughly gelatinised, and dehulls and mills with ease. Further, the colour and appearance of the grain is enhanced and the time taken for the conversion is substantially less than that hitherto required. In addition a large economy of steam is achieved.

To obviate inequality of dryness in the partially treated and drying grain it may be advisable to apply a damping or tempering by low pressure water vapour or steam. This may be achieved by inlet of hot water or low pressure steam or allowing water vapour to accumulate. During such tempering the treating vessel is closed against the action of the evacuating pump so that vapour is readily evolved internally. The grain is submitted to such moisture balancing process for a short period of time, whereafter further drying may ensue, or according to the type of grain treated the cereal may be wetted with an excess of moisture above that recognized as normal dry weight.

It will be understood that a plurality of steeping vessels may be employed in conjunction with a single drying vessel, the steeping vessels being movably mounted, upon a raised platform for example, for selective positioning above the drying vessel as required.

We claim:

1. The process for the treatment of rice, wheat and barley, which comprises steeping a batch of such grain in hot water until the grain in partially gelatinized, withdrawing the steeping water from the batch, applying heat to the batch of wet grain to heat the same to a temperature sufficient to vaporize moisture remaining in the grain and to complete gelatinization thereof, discharging accumulated vaporized moisture from the grain and then immediately subjecting the batch to vacuum treatment, while excluding air therefrom and continuing the application of heat, to vaporize the moisture remaining in the grain and dry the same to normal dryness.

2. The process for the treatment of grain which comprises steeping the grain in hot water until the grain is partially gelatinized, withdrawing the steeping water from the grain, applying dry heat to the wet grain to heat the same to a temperature sufficient to vaporize moisture contained in the grain to complete gelatinization thereof and to deprive the grain of part of its moisture, discharging the accumulated vaporized moisture from the grain, and immediately subjecting the grain to vacuum treatment, while excluding air therefrom and continuing the application of heat, to vaporize the moisture remaining in the grain and dry the same.

3. The process for the treatment of rice which comprises steeping the rice in hot water until the rice is partially gelatinized, withdrawing the steeping water from the rice, applying dry heat to the wet rice to heat the same to a temperature sufficient to vaporize moisture contained in the grain to complete gelatinization thereof, and to deprive the rice of part of its moisture, suddenly discharging the accumulated vaporized moisture from the rice to remove objectionable odor, and immediately subjecting the rice to vacuum treatment while excluding air therefrom and continuing the application of heat, to vaporize the moisture remaining in the rice and dry the same.

4. The process for the treatment of grain which comprises steeping the grain in hot water until the grain is partially gelatinized, withdrawing the steeping water from the grain, agitating the grain in air with little loss of heat, applying heat to the wet grain to heat the same to a temperature sufficient to vaporize moisture contained in the grain and complete gelatinization thereof, discharging the accumulated vaporized moisture from the grain, and immediately subjecting the grain to vacuum treatment while excluding air therefrom and continuing the application of heat, to vaporize the moisture remaining in the grain and dry the same.

5. The process for the treatment of grain which comprises steeping a batch of grain in hot water until the grain is partially gelatinized, withdrawing the steeping water from the grain and using the steeping water to treat subsequent batches of grain, applying heat to the wet grain to heat the same to a temperature sufficient to vaporize moisture contained in the grain to complete gelatinization thereof and to deprive the grain of part of its moisture, discharging the accumulated vaporized moisture from the grain, and immediately subjecting the grain to vacuum treatment while excluding air therefrom and continuing the application of heat, to vaporize the moisture remaining in the grain and dry the same.

6. The process for the treatment of grain according to claim 5, wherein additional heat and liquid are added to the steeping water to maintain it at the desired temperature.

7. The process for the treatment of rice according to claim 3, wherein the steeping is carried out at a temperature of 55° to 80° C. and pressure of 25 to 100 pounds per square inch.

8. The process for the treatment of rice according to claim 3, wherein a temperature of approximately 110° C. is attained by the vaporized moisture prior to the sudden discharge of such moisture.

9. The process for the treatment of grain according to claim 1, wherein the vacuum drying treatment is interrupted and the grain tempered by exposure to warm moisture.

ERICH GUSTAV HUZENLAUB.
JOHN HERON ROGERS.